Aug. 21, 1956  E. G. TOUCEDA  2,759,830
METALLIC FOIL FOOD COOKING WRAPPER AND METHOD
Filed April 23, 1954
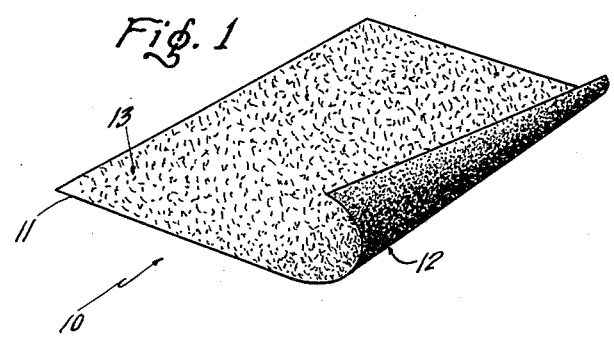
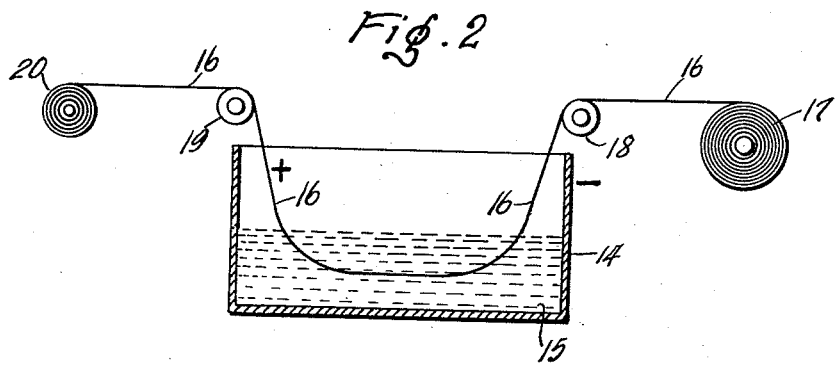
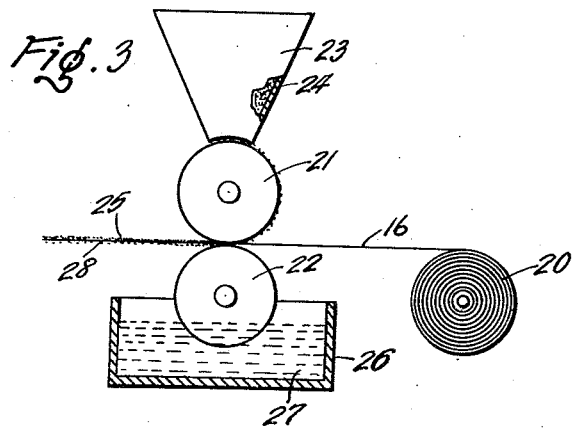
Inventor
Enrique G. Touceda
by Andros and Smith
His Attorneys United States Patent Office 2,759,830
Patented Aug. 21, 1956

2,759,830

METALLIC FOIL FOOD COOKING WRAPPER AND METHOD

Enrique G. Touceda, Washington, D. C., assignor to Processed Metals Corp., Washington, D. C., a corporation of Delaware Application April 23, 1954, Serial No. 425,173

6 Claims. (Cl. 99—171)

This invention relates to metallic food wrappers and method of making the same for use in cooking food by means of radiant heat, having particular reference to a composite sheet of aluminum treated on one surface with an infra-red absorbent dye or treated so as to provide an infra-red absorbent surface, and treated on the other surface with a flavor-intensifying agent, whereby said food product, when wrapped therein against said flavor treated surface, upon being exposed to such heat, rapidly will be cooked and said flavor driven therein, and the provision of such an article and method is a principal object of the invention.

In cooking by radiant heat, such as, for example, cooking meat in electric ovens, the melted fats drip therefrom into contact with the highly heated parts of the oven causing burning thereof, smoking and disagreeable fumes. The natural juices and flavors of the meat are likewise driven off to meet the same fate of the melted fat, and the entire cooking operation can become a messy, time-consuming, laborious and expensive procedure.

It has long been felt that it would be a distinct improvement if a solution to the above problems could be provided, and this has now been accomplished by means of the present invention.

Generally, therefore, it is an object of the invention to overcome such difficulties and disadvantages as those above set forth, and to provide a metallic food wrapper that is economic of manufacture as well as in use, and otherwise well suited to the purposes for which it is intended.

Specifically, it is an object of the invention to provide such an article of manufacture preferably comprising a composite sheet of thin gauge aluminum, one surface of the sheet being treated with an infra-red absorbent dye or treated so as to provide an infra-red absorbent surface, and the other surface of the sheet being treated with a flavor-intensifying agent, in order that a food product, when wrapped therein against the flavor treated surface, upon being exposed to the radiant heat, rapidly will be cooked and the flavor-intensifying agent rapidly will be driven into the food product.

More specifically, it is an object of the invention to provide such a wrapper for food products to be cooked by radiant heat constituting a composite sheet of aluminum having a film of aluminum oxide on each surface thereof, both of said surfaces being anodized and characterized in that there is provided thereby a sub-microporous structure thereon, one such surface being treated with a flavor-intensifying agent that substantially penetrates its film and sub-microporous structure and against which said food product is to be wrapped, and the other such surface being treated with an infra-red absorbent dye that substantially penetrates its film and sub-microporous structure and which surface is exposed to the rays of radiant heat, whereby rapidly to cook said food product and cause said flavor-intensifying agent to penetrate the same.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Fig. 1 is a perspective view illustrating such a composite aluminum wrapper;

Fig. 2 is a diagrammatic illustration of a continuous web or sheet of aluminum being anodized; and Fig. 3 is a diagrammatic illustration of an anodized web or sheet of aluminum simultaneously being treated with a flavor-intensifying agent and with an infra-red absorbent dye.

Early in the practice of applied metallurgy it was appreciated that one of the outstanding properties of aluminum was the high protection afforded by the very thin invisible film of aluminum oxide naturally formed on its surface.

More recently it has been discovered that oxide films of substantial thickness can also be formed by anodic treatment in certain electrolytes, usually of an acid character. These anodic coatings contain minute pores and during anodic treatment the current carried by the electrolyte in the pores converts the base metal into aluminum oxide. During formation the oxide grows into the metal, leaving the first-formed oxide on the surface. As it is integral with the aluminum, excellent adhesion to the base metal is obtained. A unique characteristic of these coatings is their sub-microscopic porosity requiring the electron microscope for resolution. Pore diameters may average 0.1 micron in diameter. As 1 micron$=10^{-4}$ cm. their dimensions are extremely small. The distance between the pores may average 0.5 micron. Coatings formed by anodizing are extremely hard and, as such, are unusually resistant to abrasion and wear, a property not characteristic of aluminum and its alloys.

A number of different electrolytes have been used in the anodizing process. When an aqueous solution containing about 15–25% of sulfuric acid is used, clear transparent coatings are formed on pure aluminum and translucent coatings on metal of lower purity, such as 2S sheet. Extremely hard and dense coatings are formed when oxalic acid is added to the electrolyte. Anodic reactions on other metals, including magnesium, zinc and cadmium have been studied using such electrolytes as sodium hydroxide and oxalic acid and sodium carbonate. In all instances, an oxide film is formed initially on the surface, and is sometimes replaced by a sulfate, hydroxide, or carbonate film, depending upon the solubility products of the compounds. A typical anodizing solution for magnesium, for example, may contain 25% sodium hydroxide, 7% diethylene glycol, and 0.2% sodium oxalate. The coatings produced will be essentially $Mg(OH)_2$. They are hard, dense, but still relatively porous.

Referring more particularly to the drawing, there is indicated generally at 10 a composite metallic sheet or web, preferably thin gauge aluminum foil 11. This foil, on both surfaces, may be provided with a very thin film of aluminum oxide. As will more fully appear hereinafter, both surfaces of the foil are anodized and one surface thereof is then treated with an infra-red absorbent dye 12, and the other surface thereof is treated with a flavor-intensifying agent 13. Preferably the dye is black and the flavor-intensifying agent may contain such materials as mono-sodium glutamate, anise, clove, curry, chile powder, or other spices.

In Fig. 2 there is diagrammatically shown an anodizing tank 14 containing a suitable anodizing solution 15. A continuous web or foil 16, coming off a mill roll 17 is run around an idler roller 18 through the anodizing bath 15, around another idler roller 19 and wound into roll form as at 20. The anodizing treatment of both surfaces of the web 16 is characterized by a sub-microporous structure, as above described, and the completed roll is then ready for further treatment.

Such further treatment is diagrammatically depicted in Fig. 3 wherein the web 16 from the roll 20 is passed through two applicator rollers 21 and 22 respectively. Above the applicator roller 21 is a hopper 23 containing a suitable flavor-intensifying agent, solution, or gas 24 which treats the web 16 on one surface thereof with such agent as indicated at 25. The applicator roller 22 rotates in a tank 26 having a suitable infra-red absorbent dye solution 27 and treats the other surface of the web 16 as indicated at 28. Such an agent, solution or gas, and particularly the dye solution, penetrates the interstices of the microporous or sub-microporous structures.

Such composite metallic foil may then be shipped in any suitable manner for use in the home or elsewhere wherever cooking is done by radiant heat. The food product may then completely be wrapped or enveloped in such material prior to cooking, whereby the food product, for example, steak or a roast, when wrapped therein in contact with the flavor treated surface, upon being exposed to the radiant heat, rapidly will be cooked and the flavor-intensifying agent rapidly will be caused to penetrate the same, with the elimination of the difficulties and disadvantages heretofore set forth attended by the advantages herein claimed.

It will thus be seen that the objects hereinbefore set forth may readily and efficiently be attained, and since certain changes in carrying out the above method, and certain modifications in the article which embodies the invention may be made without departing from its scope, it is intended that all matter contained in the above description or shown in the accompanying drawing shall be interpreted as illustrative and not in a limiting sense; for example, one side of the aluminum foil may be treated chemically or painted or enameled to produce an infra-red absorbent surface, substantially non-porous in character, without violating the spirit of the invention.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. An article of manufacture to be used as a material for wrapping food products to be cooked under conditions of radiant heat, comprising a composite sheet of relatively thin metal that will withstand said heat; one surface of said sheet being infra-red absorbent; and the other surface of said sheet being treated with a flavor-intensifying agent; whereby said food product, when wrapped therein in contact with said flavor coated surface, upon being exposed to said heat, rapidly will be cooked and said flavor-intensifying agent rapidly will be driven therein, because of said infra-red absorbent surface.

2. An article of manufacture to be used as a material for wrapping food products to be cooked under conditions of radiant heat, comprising a composite sheet of relatively thin metal that will withstand said heat; one surface of said sheet being treated with an infra-red absorbent material; and the other surface of said sheet being treated with a flavor-intensifying agent; whereby said food product, when wrapped therein in contact with said flavor coated surface, upon being exposed to said heat, rapidly will be cooked and said flavor-intensifying agent rapidly will be driven therein, because of said infra-red absorbent material.

3. An article of manufacture to be used as a material for wrapping food products to be cooked under conditions of radiant heat, comprising a composite sheet of aluminum; one surface of said sheet being treated with an infra-red absorbent dye; and the other surface of said sheet being treated with a flavor-intensifying agent; whereby said food product, when wrapped therein in contact with said flavor treated surface, upon being exposed to said heat, rapidly will be cooked and said flavor-intensifying agent rapidly will be driven therein, because of said infra-red dye.

4. An article of manufacture for use in wrapping food products to be cooked by radiant heat, comprising a composite sheet of aluminum; said sheet being anodized on each surface; one anodized surface being treated with an infra-red absorbent dye; and the other anodized surface of said sheet being treated with a flavor-intensifying agent; whereby said food product, when wrapped therein in contact with said flavor treated surface, upon being exposed to said heat, rapidly will be cooked and said flavor-intensifying agent rapidly will be driven therein, because of said infra-red dye.

5. A food wrapper for use in cooking food products by radiant heat, comprising a composite sheet of aluminum; said sheet being anodized on each surface and characterized in that there is provided thereby a sub-microporous structure on each surface; one such surface being treated with a flavor-intensifying agent that substantially penetrates its sub-microporous structure and against which said food product is wrapped; and the other such surface being treated with an infra-red absorbent dye that substantially penetrates its sub-microporous structure and which surface is exposed to the rays of said radiant heat; whereby rapidly to cook said food product and cause said flavor-intensifying agent to penetrate the same.

6. An article of manufacture to be used as a material for wrapping food products to be cooked under conditions of radiant heat, comprising a composite sheet of aluminum; one surface of said sheet being treated so that it is infra-red absorbent; and the other surface of said sheet being anodized and treated with a flavor-intensifying agent; whereby said food product, when wrapped wherein in contact with said flavor treated surface, upon being exposed to said heat, rapidly will be cooked and said flavor-intensifying agent rapidly will be driven therein, because of said infra-red absorbent surface.

References Cited in the file of this patent
UNITED STATES PATENTS

| 1,861,124 | Lorber | May 31, 1932 |
| 1,962,339 | Cotton | June 12, 1934 |
| 1,978,112 | Malby | Oct. 23, 1934 |
| 2,156,987 | Hill | May 2, 1939 |
| 2,633,284 | Moffett et al. | Mar. 31, 1953 |